(12) United States Patent
Takano (10) Patent No.: US 6,960,003 B2
(45) Date of Patent: Nov. 1, 2005

(54) LIGHTING APPARATUS, LIGHTING TUBE, ADAPTER CASING AND ADAPTER

(75) Inventor: Yoji Takano, Higashiosaka (JP)

(73) Assignee: Kabushiki Kaisha Tominaga Jyushi Kogyosho, Osaka (JP)

(*) Notice: Subject to any disclaimer, the term of this patent is extended or adjusted under 35 U.S.C. 154(b) by 210 days.

(21) Appl. No.: 10/606,838

(22) Filed: Jun. 27, 2003

(65) Prior Publication Data

US 2004/0264191 A1 Dec. 30, 2004

(51) Int. Cl.[7] .............................................. F21V 19/00
(52) U.S. Cl. ...................... 362/226; 362/101; 362/260
(58) Field of Search ................................. 362/101, 226, 362/260, 294, 368, 396, 457

(56) References Cited

U.S. PATENT DOCUMENTS 4,723,200 A * 2/1988 Troen .......................... 362/260
6,123,433 A * 9/2000 Chen .......................... 362/226
2005/0057926 A1 * 3/2005 McCoy

* cited by examiner

Primary Examiner—Laura K. Tso
(74) Attorney, Agent, or Firm—Armstrong, Kratz, Quintos, Hanson & Brooks, LLP (57) ABSTRACT

A lighting apparatus includes a lighting tube 10, a socket 20 and an adapter casing 30. The lighting tube 10 has a lighting tube main body 11, a seating portion 12 provided at a basal end portion of the lighting tube main body, electrode terminals 14 provided at the seating portion, and a connecting portion cover 40 covering a connecting portion formed between the lighting tube main body and the seating portion in a hermetically sealed manner. The adaptor casing 30 and the connecting portion cover 40 are detachably connected in a state in which the socket 20 into which the seating portion 12 of the lighting tube 10 is inserted is accommodated in the socket accommodation space 31, whereby the socket 20 and the seating portion 12 of the lighting tube 10 are hermetically sealed by the adaptor casing 30 and the connecting portion cover 40.

19 Claims, 8 Drawing Sheets

LIGHTING APPARATUS, LIGHTING TUBE, ADAPTER CASING AND ADAPTER

BACKGROUND OF THE INVENTION

1. Field of the Invention

The present invention relates to a lighting apparatus, especially to a lighting apparatus preferably used in a place where water is used such as an aquarium, a terrarium, a bathroom or a washroom or in an environment where large amount of steam or dirt generates. Furthermore, the present invention also relates to a lighting tube, an adapter casing and an adapter for use in the aforementioned lighting apparatus.

2. Description of Related Art

The following description sets forth the inventor's knowledge of related art and problems therein and should not be construed as an admission of knowledge in the prior art.

Although this kind of lighting apparatus is generally equipped with a lighting tube such as a fluorescence pipe to be connected to a power supply, such apparatus tends to cause electrical problems such as electric leakage, electric shock or short-circuit by permeation of water or dirt. To avoid such problems, conventionally, the following waterproof processing and/or dust-proof processing are applied to such a lighting apparatus. That is, in a conventional lighting apparatus, the entire lighting apparatus is covered by a waterproof cover or a dustproof cover in a water-tightly sealed manner or air-tightly sealed manner to thereby prevent permeation of water or dirt.

However, since the conventional waterproof/dustproof cover encloses the entire lighting apparatus, the structure is large and complicated. Therefore, there was a difficulty in attaching the lighting apparatus. Furthermore, since the waterproof/dustproof cover had to be formed to have a dimension capable of covering the entire lighting apparatus, the cover became large, which in turn causes an increased manufacturing cost. Furthermore, although the lighting tube such as a fluorescence tube has to be exchanged as it comes to the end of life, the replacement of the lighting tube was troublesome because the entire lighting apparatus was enclosed by the cover.

The present invention was made in view of the aforementioned technical background. It is an object of the present invention to provide a lighting apparatus which is capable of assuredly sealing a portion required to be liquid-tightly or air-tightly sealed and easily replacing a lighting tube with a new one.

It is another object of the present invention to provide a lighting tube, an adapter casing and an adapter to be used for the aforementioned lighting apparatus.

SUMMARY OF THE INVENTION

According to the first aspect of the present invention, a lighting apparatus, includes:

a lighting tube having a lighting tube main body, a seating portion provided at a basal end portion of the lighting tube main body, electrode terminals provided at the seating portion, and a connecting portion cover covering a connecting portion formed between the lighting tube main body and the seating portion in a hermetically sealed manner;

a socket into which the seating portion of the lighting tube is to be inserted to electrically connect the electrode terminals; and an adapter casing having a socket accommodation space for accommodating the socket, the adapter casing being detachably connected to the connecting portion cover, wherein the adaptor casing and the connecting portion cover are detachably connected in a state in which the socket into which the seating portion of the lighting tube is inserted is accommodated in the socket accommodation space, whereby the socket and the seating portion of the lighting tube are hermetically sealed by the adaptor casing and the connecting portion cover.

According to this lighting apparatus, the connecting portion between the lighting tube main body and the seating portion is hermetically sealed (liquid-tightly and air-tightly), and the socket and the seating portion of the lighting tube is hermetically sealed by the adapter casing and the connecting portion cover. Accordingly, the invasion of substance which impedes the normal operation of the lighting apparatus can be prevented, which in turn can prevent occurrence of electrical faults such as electric leakage, electric shock or short-circuit.

Furthermore, since such invasion can be prevented without enclosing the entire lighting apparatus by a waterproof/dustproof cover, the structure of the lighting apparatus can be simplified, which in turn can reduce the manufacturing cost.

In addition, since the connecting portion cover and the adapter casing are detachably connected, the replacement of the lighting tube can be easily performed by simply detaching the connecting portion cover from the adapter casing and then replacing the lighting tube with a new one.

In the present invention, the aforementioned "substance which impedes the normal operation of the lighting apparatus" is not limited to a specific one. As such substance, various kinds of liquid including water, various kinds of vapor including water vapor and dust such as fine particles can be exemplified. Depending on the targeted substance, the lighting apparatus according to the present invention can be used as a waterproof lighting apparatus (including a moisture-proof apparatus and a drip-proof apparatus), a dustproof apparatus and the like.

It is preferable that the connecting portion cover is formed of nonconductive resin and has a peripheral wall portion surrounding the connecting portion, and sealing material of nonconductive resin is filled in a gap between the peripheral wall portion and the lighting tube main body, whereby the connecting portion cover and the lighting tube are hermetically sealed.

As the sealing material, silicone resin is preferably used.

It is preferable that a sealing packing is disposed between the adapter casing and the connecting portion cover. In this case, the sealing packing enhances the sealing of the connecting portion, which assuredly prevents invasion of substance that impedes the normal operation of the apparatus.

It is preferable that the adapter casing has an outwardly extending flange portion and the connecting portion cover has an outwardly protruding flange portion, wherein the flange portion of the adapter casing and the flange portion of the connecting portion cover are connected via a sealing packing with a tightening member.

It is preferable that the adapter casing is a box-shaped casing of nonconductive resin and has a power cord passing aperture through which the power cord is introduced into the adapter casing via a sealing bush in a hermetically sealed manner.

It is preferable that the adaptor casing is provided with an attaching portion for detachably attaching the adaptor casing to a certain portion where the lighting apparatus is to be attached. In this case, the lighting apparatus can be assuredly attached to the desired portion. The attaching portion is not specifically limited, and may be various known means.

The second aspect of the present invention is directed to a lighting tube. The lighting tube include:

a lighting tube main body;

a seating portion provided at a basal end portion of the lighting tube main body;

electrode terminals provided at the seating portion; and a connecting portion cover covering a connecting portion formed between the lighting tube main body and the seating portion in a hermetically sealed manner, wherein the lighting tube is to be used with a socket into which the seating portion of the lighting tube is to be inserted to electrically connect the electrode terminals and an adapter casing having a socket accommodation space for accommodating the socket, the adapter casing being detachably connected to the connecting portion cover, and wherein the adaptor casing and the connecting portion cover are to be detachably connected in a state in which the socket into which the seating portion of the lighting tube is inserted is accommodated in the socket accommodation space, whereby the socket and the seating portion of the lighting tube are to be hermetically sealed by the adaptor casing and the connecting portion cover.

This lighting tube can be preferably used as the lighting tube in the aforementioned lighting apparatus.

The third aspect of the present invention is directed to an adaptor casing to be used with a lighting tube and a socket, wherein the lighting tube has a lighting tube main body, a seating portion provided at a basal end portion of the lighting tube main body, electrode terminals provided at the seating portion, and a connecting portion cover covering a connecting portion formed between the lighting tube main body and the seating portion in a hermetically sealed manner, wherein the socket is to be inserted by the seating portion of the lighting tube to electrically connect the electrode terminals, and wherein the adapter casing has a socket accommodation space for accommodating the socket, the adapter casing being to be detachably connected to the connecting portion cover, wherein the adaptor casing and the connecting portion cover are to be detachably connected in a state in which the socket into which the seating portion of the lighting tube is inserted is accommodated in the socket accommodation space, whereby the socket and the seating portion of the lighting tube are to be hermetically sealed by the adaptor casing and the connecting portion cover.

The adapter casing can be preferably used as an adapter used for the aforementioned lighting apparatus.

The fourth aspect of the present invention is directed to an adaptor for use in a lighting apparatus for attaching a lighting tube. The adaptor includes a socket and an adaptor casing. The lighting tube has a lighting tube main body, a seating portion provided at a basal end portion of the lighting tube main body, electrode terminals provided at the seating portion, and a connecting portion cover covering a connecting portion formed between the lighting tube main body and the seating portion in a hermetically sealed manner. The socket is to be inserted by the seating portion of the lighting tube to electrically connect the electrode terminals. The adapter casing has a socket accommodation space for accommodating the socket, the adapter casing being to be detachably connected to the connecting portion cover. The adaptor casing and the connecting portion cover are to be detachably connected in a state in which the socket into which the seating portion of the lighting tube is inserted is accommodated in the socket accommodation space, whereby the socket and the seating portion of the lighting tube are to be hermetically sealed by the adaptor casing and the connecting portion cover.

The aforementioned adapter can be preferably used as an adapter for used in the aforementioned lighting apparatus. By using this adapter, only the lighting tube can be replaced with a new one.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/ or advantages of particular embodiments should not be construed as limiting other embodiments or the claims.

BRIEF DESCRIPTION OF THE DRAWINGS

The accompanying figures are provided by way of example, without limiting the broad scope of the invention or various other embodiments, wherein.

DETAILED DESCRIPTION OF THE PREFERRED EMBODIMENTS

Next, embodiments of the present invention will be explained with reference to the attached drawings.

Figure 1:
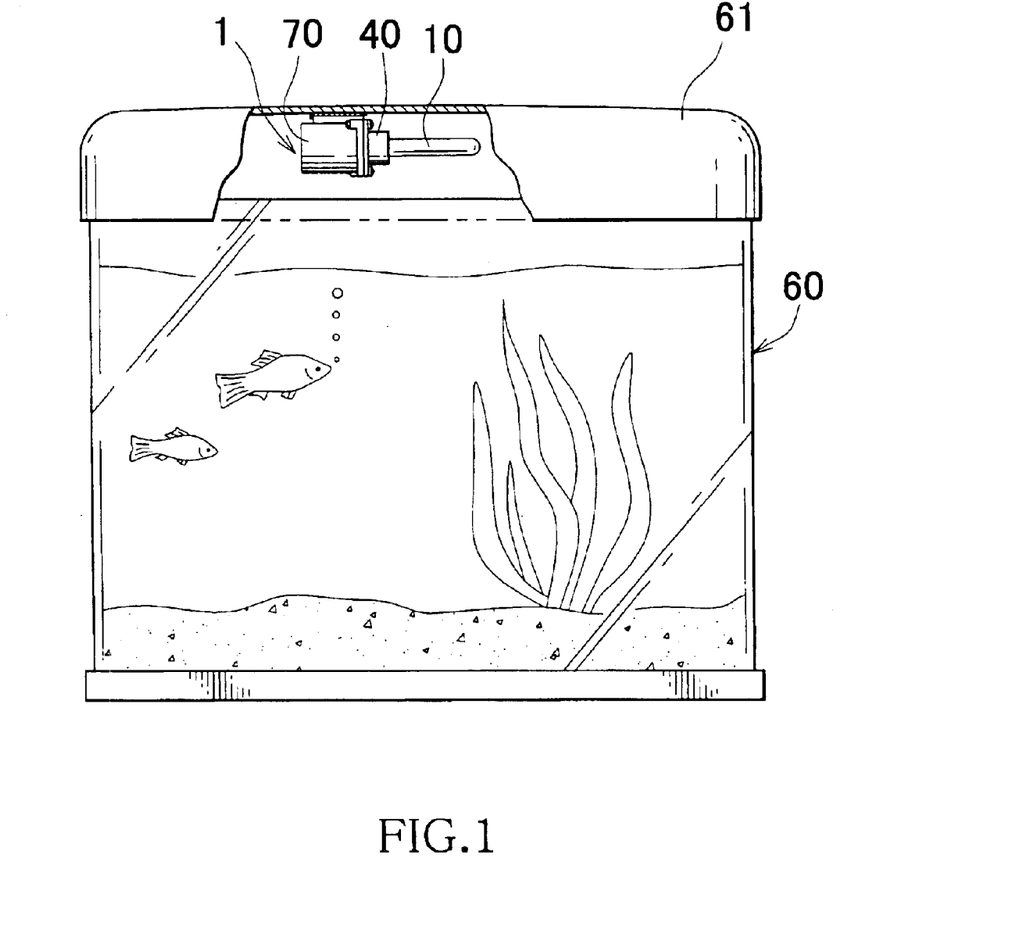
FIG. 1 is a partially broken side view showing the lighting apparatus in use according the present invention.
Figure 2:
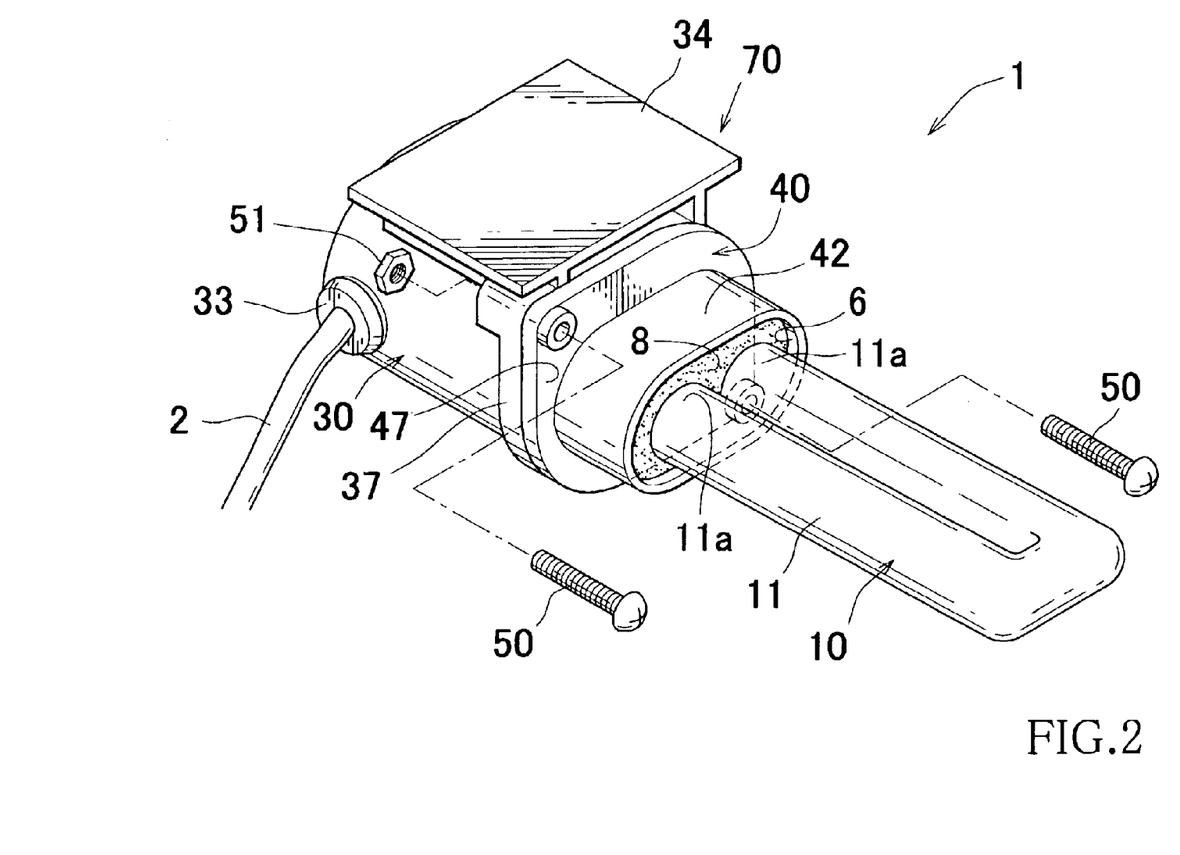
FIG. 2 is a perspective view showing the lighting apparatus.

In FIG. 1, the reference numeral "1" denotes an lighting apparatus according to an embodiment of the present invention. As shown in FIG. 1, this lighting apparatus 1 is attached to the inner surface of the upper lid 61 of the aquarium 60 to illuminate the inside of the aquarium 60 from the above.

Figure 4:
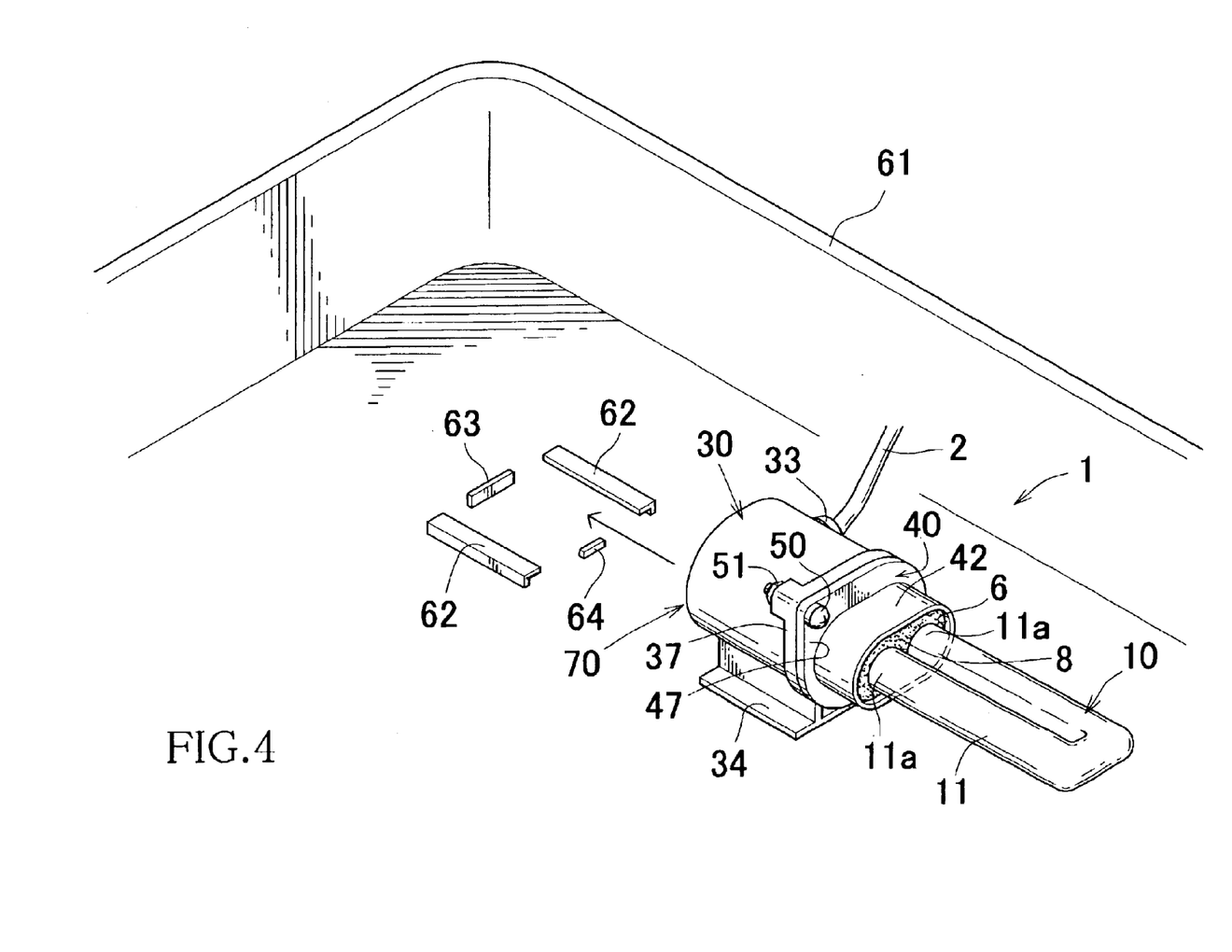
FIG. 4 is a perspective view showing the lighting apparatus which is being installed to a predetermined installing position.
Figure 5:
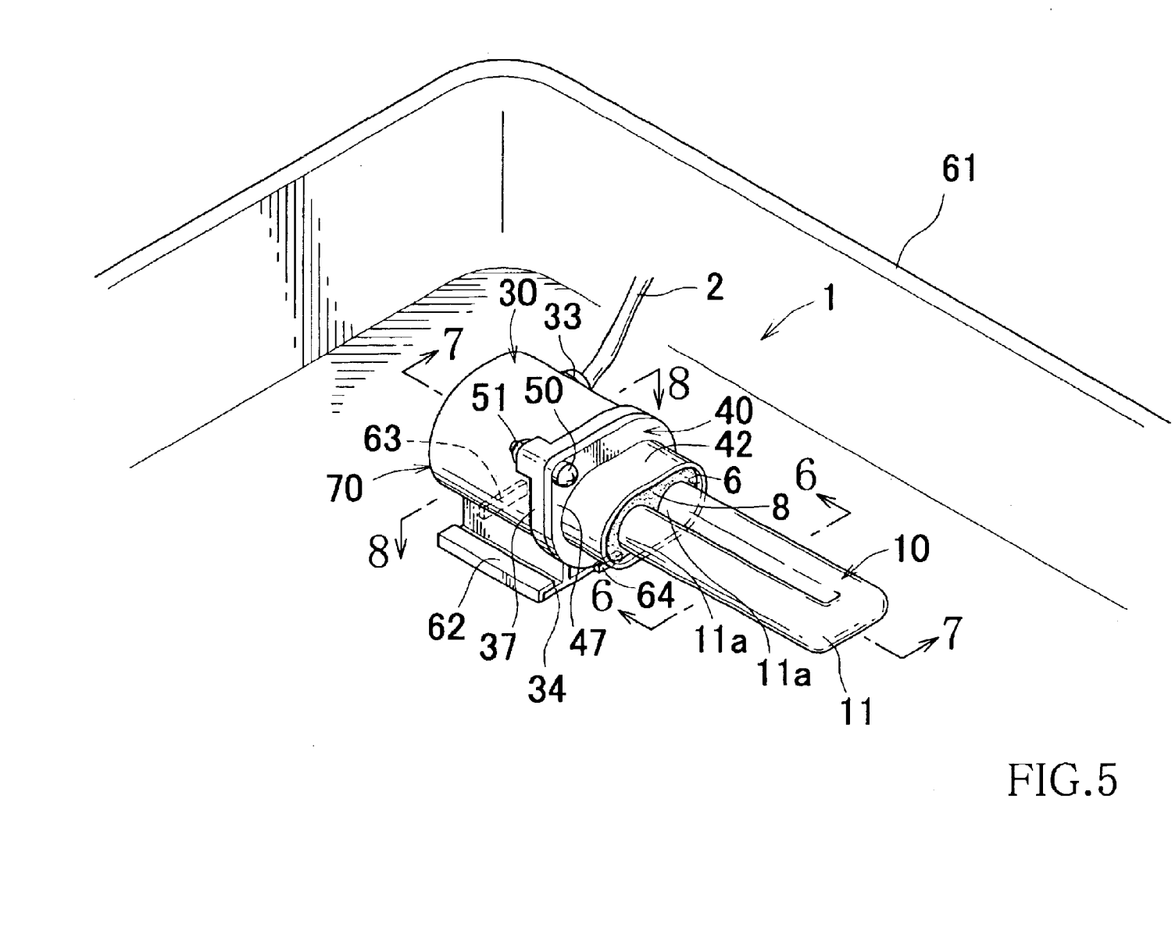
FIG. 5 is a perspective view showing the installed lighting apparatus.

In FIGS. 4 and 5, the upper lid 61 is shown in an upside-down state in which the inner surface faces upward for the purpose of explanation.

Figure 3:
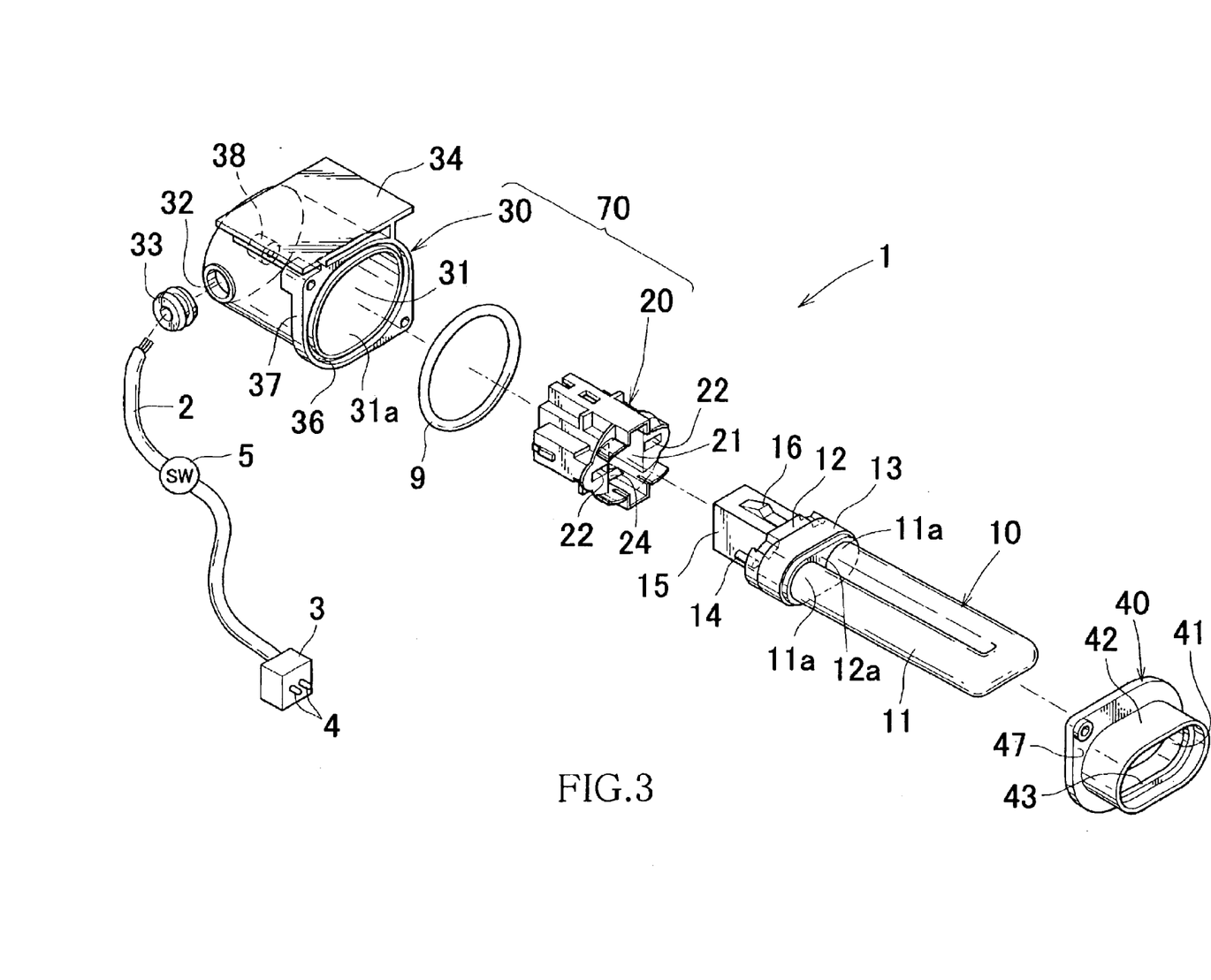
FIG. 3 is an exploded perspective view showing the lighting apparatus.

As shown in FIG. 3, this lighting apparatus 1 is equipped with a lighting tube 10 and an adapter 70 for the lighting tube 10. The adapter 70 is comprised of a socket 20 and an adapter casing 30. The lighting tube 10 is provided with a connecting portion cover 40 for sealing a predetermined portion of the lighting tube in corporation with the adapter casing 30.

Next, the structure of this lighting apparatus 1 will be explained.

The lighting tube 10 is provided with a lighting tube main body 11 having a plurality of tube ends 11a. In this embodiment, this lighting tube main body 11 is a generally U-shaped glass fluorescent lamp (light emitting tube). Accordingly, the number of tube ends 11a of the lighting tube main body 11 is two, and the basal ends of this lighting tube main body 11 are tube ends 11a and 11a. Provided at the tube ends 11a and 11a is a seating portion 12. Both the tube ends 11a and 11a are fixed to the flat surface portion 12a of the seating portion 12 in a spaced manner.

Figure 7:
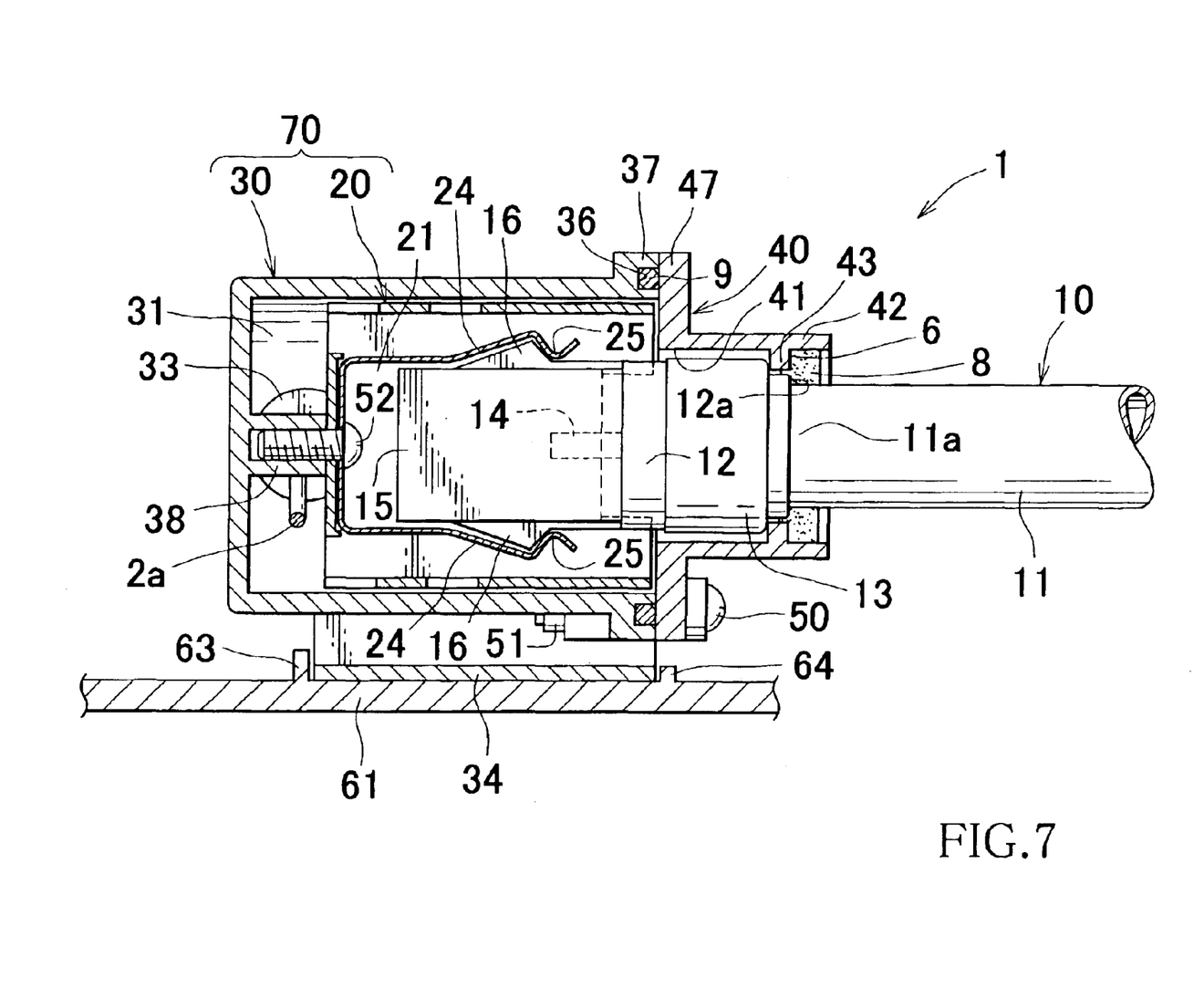
FIG. 7 is an enlarged cross-sectional view taken along the line 7—7 in FIG. 5.

In this lighting tube 10, a sleeve 13 is provided at the external periphery of the seating portion 13. From the rear surface portion (opposite to the flat surface portion 11) of the seating portion 12, two pin-shaped electrode terminals 14 (see FIG. 8) are protruded rearward. The electrode terminal 14 is made of conductive metal. At the rear surface portion of the seating portion 12 between the electrode terminals 14 and 14, a supporting protrusion 15 is integrally protruded rearward. At the opposite side surfaces of the protrusion 15, engaging protrusions 16 and 16 are integrally formed, as shown in FIG. 7. In the supporting protrusion 15, a lighter (not shown) may be embedded.

The socket 20 is made of non-conductive resin and provided with a total of two electrode terminal insertion holes 22 and 22 into which the electrode terminals 14 are detachably inserted. In each insertion hole 22, a connecting terminal 23 is provided. This connecting terminal 23 is made of conductive metal. To this connecting terminal 23, the electrode terminal 14 inserted into the insertion hole 22 is electrically connected in a detachably manner. In this connected manner, the socket 20 and the seating portion 12 are connected each other.

Figure 8:
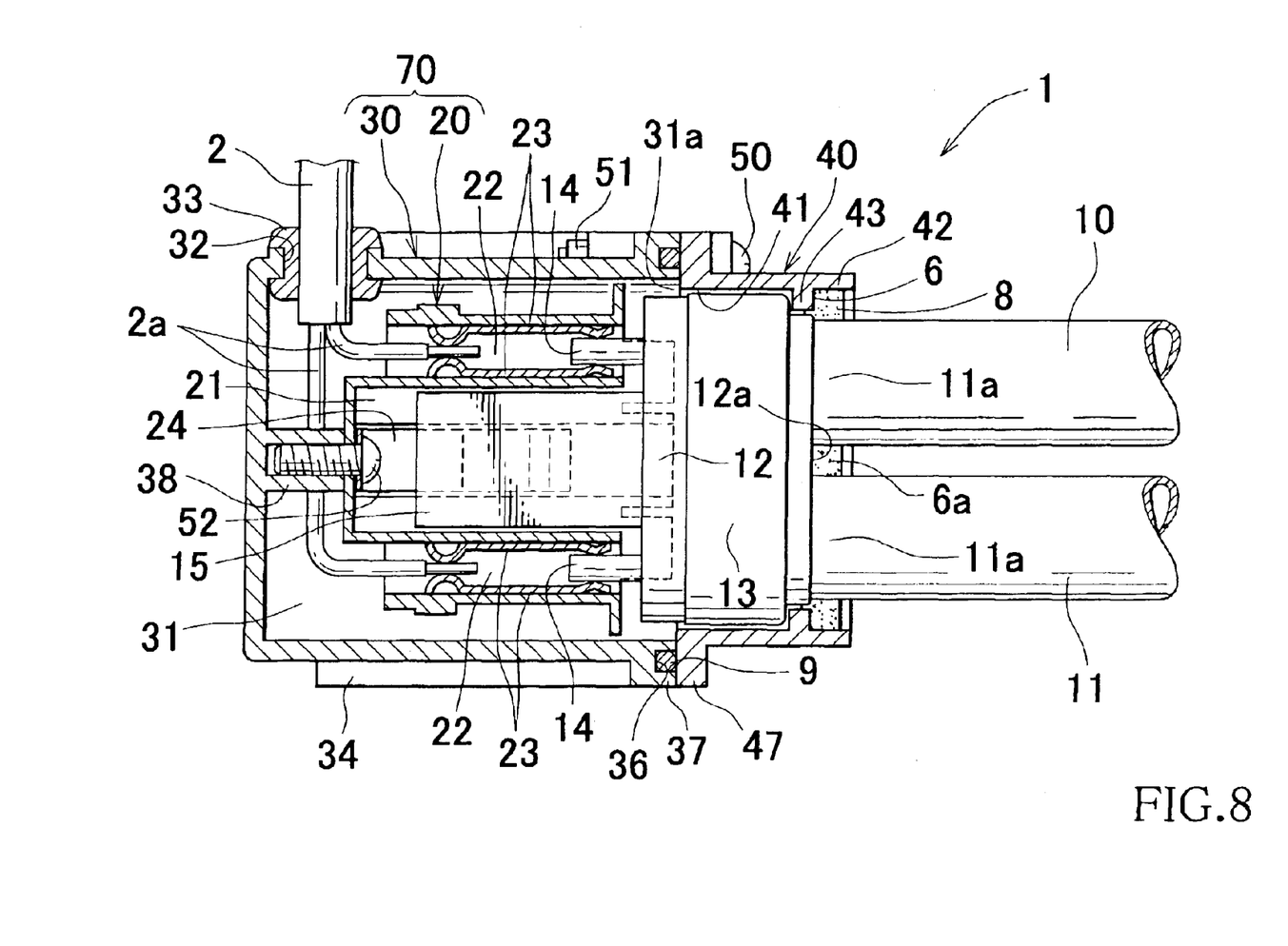
FIG. 8 is an enlarged cross-sectional view taken along the line 8—8 in FIG. 5.

The socket 20 is provided with a supporting dented portion 21 for supporting the lighting tube 10 as shown in FIG. 3. As shown in FIGS. 7 and 8, the supporting protrusion 15 of the lighting tube 10 is inserted into the supporting dented portion 21, whereby the lighting tube 10 is supported via the protrusion 15. Further, as shown in FIG. 7, in this supporting dented portion 21, a generally U-shaped metal plate spring having a pair of opposed elastic engaging ledges 24 and 24 is disposed. Each elastic engaging ledge 24 has an inwardly protruded stopper 25. In a state in which the supporting protrusion 15 of the lighting tube 10 is inserted into the supporting dented portion 21, the stopper 25 of the elastic engaging ledge 24 is engaged with the engaging protrusion 16. This prevents the supporting protrusion 15 of the lighting tube 10 from being unplugged from the supporting dented portion 21.

The adapter casing 30 is made of nonconductive plastic and formed into a cylindrical shape with a bottom as shown in FIG. 3. This adapter casing 30 has a socket accommodation space 31. In FIG. 3, the reference numeral "31a" denotes an opening of the socket accommodation space 31. Through this opening 31a, the socket 20 is inserted into the socket accommodation space 31 in a slightly tight manner. In this accommodation state, as shown in FIG. 7, the socket 20 and the elastic engaging ledges 24 are detachably attached to the protrusion 38 with a screw hole integrally formed on the inner surface of the bottom wall portion of the adapter casing 30 with a screw 52. Thus, the socket 20 and the elastic engaging ledges 24 are prevented from being unplugged from the socket accommodation space 31. By accommodating the socket 20 in the socket accommodation space 31 as mentioned above, the adapter 70 is assembled. The socket 20 can be unplugged from the socket accommodation space 31 by detaching the screw 52.

As shown in FIG. 3, a power cord passing aperture 32 is formed in the peripheral wall of the adapter casing 30. As shown in FIG. 8, a power cord 2 is inserted into the power cord passing aperture 32 via a rubber sealing bush 33. Furthermore, one end portion of the power cord 2 is divided into two end portions in the adapter casing 30, and the divided cords 2a are electrically connected to the connecting terminals 23 respectively. On the other hand, at the other end of the power cord 2, a ballast 3 having plugs 4 is connected via a switch 5 as shown in FIG. 3. Thus, when the switch 5 is turned on in the state in which the plugs 4 are connected to a plug outlet (not shown), electric power is supplied to the lighting tube 10 via the power cord 2, thereby turning on the lighting tube main body 11. On the other hand, by turning off the switch 5, the power supply is interrupted, thereby turning off the lighting tube main body 11.

The adapter casing 30 is provided with an attaching portion 34 integrally formed on the peripheral surface thereof. This attaching portion 34 is formed into a plate shape (nearly flat plate shape).

The aforementioned connecting portion cover 40 is made of nonconductive plastic. The cover is used to hermetically seal the socket accommodate space 31 by closing the opening 31a of the socket accommodation space 31. This connecting portion cover 40 has an insertion hole 41 of a generally elongated circular shape into which the lighting tube main body 11 of the lighting tube 10 is inserted as shown in FIG. 3. The opening size of this insertion hole 41 is set to be the same as or slightly larger than the external size of the basal end portion of the lighting tube main body 11, so that the lighting tube 10 can be easily inserted into the insertion hole 41. Furthermore, around the peripheral edge of the insertion hole 41, a cylindrical peripheral wall portion 42 surrounding the insertion hole 41 is integrally formed. At the axially central portion of the inner surface of the peripheral wall portion 42, an inwardly protruded ridge 43 is integrally formed around the entire periphery thereof. This protruded ridge 43 is used to receive sealing material 8 which will be detailed.

Figure 6:
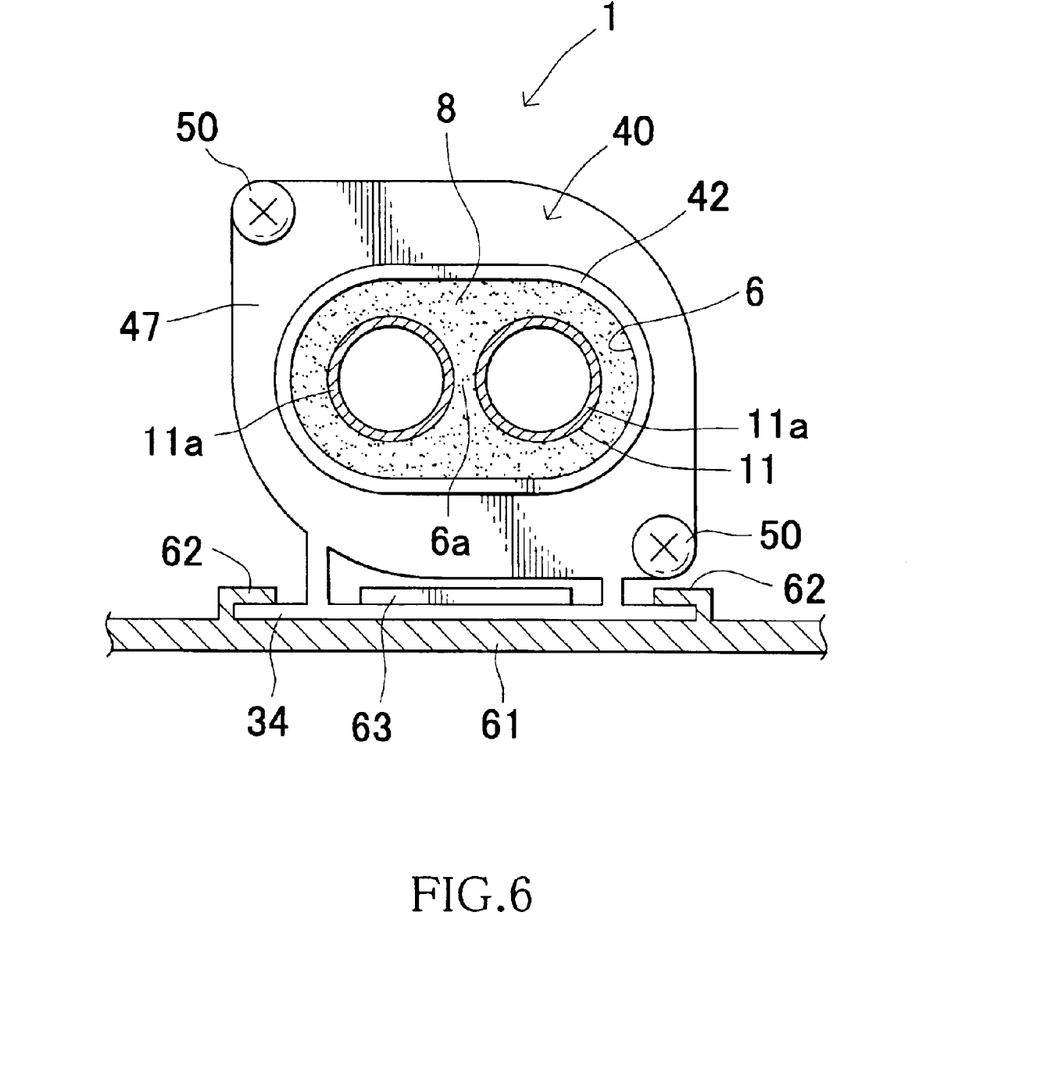
FIG. 6 is an enlarged cross-sectional view taken along the line 6—6 in FIG. 5.

In the insertion hole 41 of this connecting portion cover 40, the lighting tube 10 inserted from its leading end. During the insertion operation of this lighting tube 10, the protruded ridge 43 comes into contact with the seating portion 12, thereby causing the positioning of the cover 40 in relation to the lighting tube 10. In this inserted state, as shown in FIGS. 7 and 8, the flat surface portion 12a of the seating portion 12 is located at a position behind the front opening of the peripheral wall portion 42. In the dented portion 6 formed by the peripheral wall portion 40 and the flat surface portion 12a, nonconductive resin sealing material 8 is filled, whereby the connecting portion between the lighting tube main body 11 and the seating portion 12 is hermetically sealed. As shown in FIGS. 6 and 8, this sealing material 8 is filled such that it surrounds the external peripheral surfaces of both the tube ends 11a and 11a and is filled in the gap 6a between the tube ends 11a and 11a.

This sealing method will be explained as follows. That is, softened or molten nonconductive resin material (e.g., silicon resin) is injected into the entire dented portion 6 to fill therein. Thus, the connecting portion between the lighting tube main body 11 and the seating portion 12 is hermetically (liquid-tightly and air-tightly) sealed.

In this embodiment, since nonconductive resin material is injected into the dented portion 6, the injection amount of the nonconductive resin material can be increased. Furthermore, the nonconductive resin material is received by the protruded ridge 43 of the peripheral wall portion 42 and the flat surface portion 12a of the seating portion 12, which prevents the leakage of the nonconductive resin material. Accordingly, the connecting portion can be assuredly sealed by the sealing material 8. Furthermore, the connecting portion is sealed by resin material, the resin material can be fully filled in the gap 6a between the tube ends 11a and 11a of the lighting tube main body 11, resulting in assured sealing.

Thus, the connecting portion cover 40 is attached to the connecting portion (or its vicinity) between the lighting tube main body 11 and the seating portion 12 in the state in which the connecting portion is sealed.

Furthermore, in this embodiment, the entire exterior surface of the sleeve 13 of the seating portion 12 of the lighting tube 10 is covered by the peripheral wall portion 42 of the cover 40 and the sealing material 8. Therefore, the external surface of the sleeve 13 is never exposed.

The connecting portion cover 40 is provided with an outwardly extruded flange portion 47 along the entire periphery thereof. On the other hand, at the peripheral portion of the opening 31a of the adapter casing 30, an outwardly extruded flange portion 37 is integrally formed so as to surround the entire periphery thereof. The flange portion 37 of the adapter casing 30 and the flange portion 47 of the cover 40 are detachably connected at two portions thereof with bolts 50 and nuts 51. Thus, the socket 20 and the seating portion 12 of the lighting tube 10 are liquid-tightly sealed. In this connected state, the socket accommodation space 31a of the adapter casing 30 is liquid-tightly covered and closed by the connecting portion cover 40.

Furthermore, on the connecting surface of the flange portion 37 of the adapter casing 30, a circular packing accommodation groove 36 is formed. In this groove 36, a circular rubber sealing packing 9 is fitted. This sealing packing 9 is used to prevent the invasion of liquid (in this embodiment, the water in the aquarium 60 and the water vapor) through the connecting portion between the flange portion 37 of the adapter casing 30 and the flange portion 47 of the cover 40. The sealing packing 9 is disposed between and pinched by the flange portion 37 of the adapter casing 30 and the flange portion 47 of the connecting portion cover 40 in the state that the sealing packing 9 is fitted in the aforementioned packing accommodation groove 36.

In the embodiment, although the circular packing accommodation groove 36 is formed on the inner surface of the flange portion 37 of the adapter casing 30, the present invention is not limited to this. For example, the packing accommodation groove 36 may be formed on the inner surface (i.e., the connecting surface) of the flange portion 47 of the connecting portion cover 40.

The aforementioned lighting apparatus 1 is attached to the inner surface of the aquarium 60.

That is, as shown in FIG. 4, on the inner surface of the upper lid 61, a pair of opposed engaging ledges 62 and 62 each having an L-shape in cross-section disposed at a certain distance and a stopper 63 disposed between the engaging ledges 62 and 62 are provided. The attaching portion 34 of the adapter casing 30 is tightly inserted between the engaging ledges 62 and 62 from their ends to be engaged with the corresponding engaging ledges. Thus, as shown in FIG. 5, the attaching portion 34 of the lighting apparatus 1 is detachably attached to the inner surface of the upper lid 61. Further, during the insertion operation of the attaching portion 34, the leading edge portion of the attaching portion 34 comes into contact with the stopper 63 to thereby be positioned. Furthermore, in this embodiment, in order to prevent the unexpected displacement of the attaching portion 34, a displacement prevention protrusion 64 is protruded on the inner surface of the upper lid 61. To the contrary, the detachment of the attaching portion 34 can be performed by an disinstallation operation contrary to the above-explained installation operation. In this embodiment, the height of the displacement prevention protrusion 64 is set to be lower than that of the stopper 63. In detail, the height is set such that the installation operation of the attaching portion 34 and the disinstallation operation thereof can be easily performed.

In the aforementioned lighting apparatus 1, in order to detach the lighting tube 10 for replacing it with a new one, first, the tightening members consisting of the bolt 50 and the nut 51 are detached. Subsequently, the lighting tube main body 11 and the cover 40 are moved toward the disinstallation direction in relation to the adapter 70 with a hand. Then, in accordance with this movement, the stopper 25 of the elastic engaging ledge 24 is moved outwardly by the engaging protrusions 16. The further movement of the lighting tube 10 in the disinstallation direction causes the disengagement of the stopper 25 from the engaging protrusion 16. Thus, the lighting tube 10 can be detached. When the engaging protrusion 16 is disengaged from the stopper 25, the elastic engaging ledge 24 returns to its original position by its resilient restoration force. The connecting portion cover 40 is detached together with the lighting tube 10 in the state that the cover 40 is fixed to the lighting tube 10.

In cases where a new lighting tube 10 is installed, a new lighting tube 10 to which a connecting portion cover 40 is previously attached is prepared. Then, the supporting protrusion 15 of the lighting tube 10 is inserted into the supporting dented portion 21 of the socket 20 with a hand gripping the lighting tube main body 11 and/or the cover 40. In accordance with the insertion operation of the lighting tube 10, the stopper 25 of the elastic engaging ledge 24 is moved outwardly while being pushed outwardly by the engaging protrusion 16. When the supporting protrusion 15 is further inserted and passes the position of the stopper 25, the elastic engaging ledge 24 returns to its original position by its resilient restoration force. Thus, as shown in FIG. 7, the stopper 25 is engaged with the engaging protrusion 16. This completes the insertion operation of the supporting protrusion 15 of the lighting tube 10 into the supporting dented portion 21. Thereafter, by tightening the bolt 50 and the nut 51, the installation operation of the lighting tube 10 is completed.

The aforementioned disinstallation/installation operation can be performed after detaching the attaching portion 34 from the inner surface of the upper lid 61.

In the aforementioned lighting apparatus 1, since the connecting portion between the lighting tube main body 11 and the seating portion 12 is liquid-tightly sealed and the socket 20 and the seating portion 12 are liquid-tightly sealed, it is possible to prevent: (a) the invasion of the water in the aquarium 60 into the inside of the adapter casing 30; (b) the invasion of water vapor generated in the aquarium 60 into the inside of the adapter casing 30; and (c) the invasion of water drop adhered to the exterior surface of the lighting tube main body 11 into the adapter casing 30. Therefore, according to this lighting apparatus 1, it is possible to prevent the generation of electrical problems such as electric leakage, electric shock or short circuit, which enables the use of the lighting apparatus 1 with safety.

Furthermore, since the invasion of water, etc. into the adapter casing 30 can be prevented though the entire lighting apparatus is not covered by a waterproof cover, the structure of the lighting apparatus 1 is simple. Accordingly, it is possible to easily perform the installation of the lighting apparatus operation and the replacement of the lighting tube 10, and to manufacture the lighting apparatus 1 at low cost.

Furthermore, since the sealing packing 9 is disposed at the connecting portion of the flange portion 37 and the adapter 30 and the flange portion 47 of the connecting portion cover 40, the invasion of water into the adapter casing 30 via the connecting portion can be assuredly prevented.

Furthermore, since the adapter casing 30 is provided with the attaching portion 34, it is possible to assuredly attach the adapter 70 to the inner surface of the upper lid 61. In addition, since the attaching portion 34 is detachably attached to the inner surface of the upper lid 61, the adapter 70 can be detached from the inner surface of the upper lid 61 at the time of cleaning the upper lid 60 and/or replacing the lighting tube 10. This enhances the cleaning of the aquarium 60 or the replacement of the lighting tube 10.

Although a lighting apparatus according to an embodiment of the present invention was explained, the present invention is not limited to the above and can be modified or changed variously.

For example, the adapter casing 30 may have a suction cup in place of the aforementioned attaching portion 34 so that the adapter casing 30 can be detachably attached to the inner surface of the upper lid 61 (i.e., the place where the lighting apparatus is to be attached) by such suction cup. Alternatively, the adapter casing can be detachably attached by magnetic force or screws and nuts.

In the aforementioned embodiment, the aforementioned lighting apparatus 1 has a waterproof structure (waterproof lighting apparatus). However, the present invention can be also applied to a structure that can prevent invasion of any other liquid (liquid-proof lighting apparatus).

Furthermore, the lighting apparatus according to the present invention can be a dust-proof apparatus capable of preventing invasion of dust which may harm the normal operation thereof. This can be easily understood by replacing the wording of "liquid-tight" in the aforementioned embodiment with the wording of "air-tight."

In the aforementioned embodiment, the lighting tube 10 is a generally U-shaped tube having one sleeve. However, the lighting tube according to the present invention can be a generally H-shaped tube or a straight-shaped tube. In the latter case, each end portion constitutes a sleeve portion.

Furthermore, the adapter casing can be an integral type in which the socket is integrally formed in the socket accommodation space of the adapter casing.

According to the first aspect of the present invention, the connecting portion between the lighting tube main body and the seating portion is hermetically sealed (liquid-tightly and air-tightly), and the socket and the seating portion of the lighting tube is hermetically sealed by the adapter casing and the connecting portion cover. Accordingly, invasion of substance which impedes the normal operation of the lighting apparatus can be prevented, which in turn can prevent occurrence of electrical faults such as electric leakage, electric shock or short-circuit.

Furthermore, since such invasion can be prevented without enclosing the entire lighting apparatus by a waterproof/dustproof cover, the structure of the lighting apparatus can be simplified, which in turn can reduce the manufacturing cost.

In addition, since the connecting portion cover and the adapter casing are detachably connected, the replacement of the lighting tube can be easily performed by simply detaching the connecting portion cover from the adapter casing and then replacing the lighting tube with a new one.

In cases where the connecting portion cover is formed of nonconductive resin and has a peripheral wall portion surrounding the connecting portion and sealing material of nonconductive resin is filled in a gap between the peripheral wall portion and the lighting tube main body, whereby the connecting portion cover and the lighting tube are hermetically sealed, invasion of substance which impedes the normal operation of the lighting apparatus can be prevented, which in turn can prevent occurrence of electrical faults such as electric leakage, electric shock or short-circuit.

In cases where a sealing packing is disposed between the adapter casing and the connecting portion cover, the sealing packing enhances the sealing of the connecting portion, which assuredly prevents invasion of substance that impedes the normal operation of the apparatus.

In cases where the adapter casing has an outwardly extending flange portion and the connecting portion cover has an outwardly protruding flange portion and the flange portion of the adapter casing and the flange portion of the connecting portion cover are connected via a sealing packing with a tightening member, it is possible to easily and assuredly connect the connecting portion cover to the adapter casing.

In cases where the adapter casing is a box-shaped casing of nonconductive resin and has a power cord passing aperture through which the power cord is introduced into the adapter casing via a sealing bush in a hermetically sealed manner, invasion of substance which impedes the normal operation of the lighting apparatus can be prevented, which in turn can prevent occurrence of electrical faults such as electric leakage, electric shock or short-circuit.

In cases where the adaptor casing is provided with an attaching portion for detachably attaching the adaptor casing to a certain portion where the lighting apparatus is to be attached, the lighting apparatus can be assuredly attached to the desired portion.

According to the second aspect of the present invention, the lighting tube can be preferably used as the lighting tube in the aforementioned lighting apparatus.

According to the third aspect of the present invention, the adapter casing can be preferably used as an adapter used for the aforementioned lighting apparatus.

According to the fourth aspect of the present invention, the adapter can be preferably used as an adapter for used in the aforementioned lighting apparatus. By using this adapter, only the lighting tube can be replaced with a new one.

While illustrative embodiments of the present invention have been described herein, the present invention is not limited to the various preferred embodiments described herein, but includes any and all embodiments having modifications, omissions, combinations (e.g., of aspects across various embodiments), adaptations and/or alterations as would be appreciated by those in the art based on the present disclosure. The limitations in the claims are to be interpreted broadly based the language employed in the claims and not limited to examples described in the present specification or during the prosecution of the application, which examples are to be construed as non-exclusive. For example, in the present disclosure, the term "preferably" is non-exclusive and means "preferably, but not limited to." Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited.

What is claimed is:

1. A lighting apparatus, comprising:
   a lighting tube having a lighting tube main body, a seating portion provided at a basal end portion of said lighting tube main body, electrode terminals provided at said seating portion, and a connecting portion cover covering a connecting portion formed between said lighting tube main body and said seating portion in a hermetically sealed manner;
   a socket into which said seating portion of said lighting tube is to be inserted to electrically connect said electrode terminals; and
   an adapter casing having a socket accommodation space for accommodating said socket, said adapter casing being detachable connected to said connecting portion cover,
   wherein said adaptor casing and said connecting portion cover are detachable connected in a state in which said socket into which said seating portion of said lighting tube is inserted is accommodated in said socket accommodation space, whereby said socket and said seating portion of said lighting tube are hermetically sealed by said adaptor casing and said connecting portion cover.

2. The lighting apparatus as recited in claim 1, wherein said connecting portion cover is formed of nonconductive resin and has a peripheral wall portion surrounding said connecting portion, and wherein sealing material of nonconductive resin is filled in a gap between said peripheral wall portion and said lighting tube main body, whereby said connecting portion cover and said lighting tube are hermetically sealed.

3. The lighting apparatus as recited in claim 2, wherein said sealing material is silicone resin.

4. The lighting apparatus as recited in claim 1, wherein a sealing packing is disposed between said adapter casing and said connecting portion cover.

5. The lighting apparatus as recited in claim 1, wherein said adapter casing has an outwardly extending flange portion and said connecting portion cover has an outwardly protruding flange portion, wherein said flange portion of said adapter casing and said flange portion of said connecting portion cover are connected via a sealing packing with a tightening member.

6. The lighting apparatus as recited in claim 5, wherein said adapter casing is a box-shaped casing of nonconductive resin and has a power cord passing aperture through which the power cord is introduced into said adapter casing via a sealing bush in a hermetically sealed manner.

7. The lighting apparatus as recited in claim 1, wherein said adaptor casing is provided with an attaching portion for detachably attaching said adaptor casing to a certain portion where said lighting apparatus is to be attached.

8. A lighting apparatus, comprising:
   a lighting tube having lighting tube main body, a seating portion provided at a basal end portion of said lighting tube main body, electrode terminals provided at said seating portion, and a connecting portion cover covering a connecting portion formed between said lighting tube main body and said seating portion in a hermetically sealed manner;
   a socket into which said seating portion of said lighting tube is to be inserted to electrically connect said electrode terminals; and
   an adapter casing having a socket accommodation space for accommodating said socket, said adapter casing being detachably connected to said connecting portion cover;
   wherein said connecting portion cover is formed of nonconductive resin and has a peripheral wall portion surrounding said connecting portion and an outwardly extending flange portion, and sealing material of nonconductive resin is filled in a gap between said peripheral wall portion and said lighting tube main body, whereby said connecting portion cover and said lighting tube are hermetically sealed;
   wherein said adapter casing is a box-shaped casing made of nonconductive resin and has an outwardly extending flange portion,
   wherein said flange portion of said adapter casing and said flange portion of said connecting portion cover are detachably connected via a sealing packing with a tightening member in a state in which said socket into which said seating portion of said lighting tube is inserted is accommodated in said socket accommodation space, whereby said socket and said seating portion of said lighting tube are hermetically sealed in a space surrounded by said adapter casing and said connecting portion cover, and
   wherein said adapter casing has a power cord penetrating aperture through which a power cord is introduced into said adapter casing via a sealing bush in a hermetically sealed manner.

9. A lighting tube, comprising:
   a lighting tube main body;
   a seating portion provided at a basal end portion of said lighting tube main body;
   electrode terminals provided at said seating portion; and
   a connecting portion cover covering a connecting portion formed between said lighting tube main body and said seating portion in a hermetically sealed manner,
   wherein said lighting tube is to be used with a socket into which said seating portion of said lighting tube is to be inserted to electrically connect said electrode terminals, and an adapter casing having a socket accommodation space for accommodating said socket, said adapter casing being detachably connected to said connecting portion cover, and
   wherein said adaptor casing and said connecting portion cover are to be detachably connected in a state in which said socket into which said seating portion of said lighting tube is inserted is accommodated in said socket accommodation space, whereby said socket and said seating portion of said lighting tube are to be hermetically sealed by said adaptor casing and said connecting portion cover.

10. The lighting tube as recited in claim 9, wherein said connecting portion cover is formed of nonconductive resin and has a peripheral wall portion surrounding said connecting portion, and wherein sealing material of nonconductive resin is filled in a gap between said peripheral wall portion and said lighting tube main body, whereby said connecting portion cover and said lighting tube are hermetically sealed.

11. The lighting tube as recited in claim 9, wherein said sealing material is silicone resin.

12. An adaptor casing to be used with a lighting tube and a socket, wherein said lighting tube has a lighting tube main body, a seating portion provided at a basal end portion of said lighting tube main body, electrode terminals provided at said seating portion, and a connecting portion cover covering a connecting portion formed between said lighting tube main body and said seating portion in a hermetically sealed manner, wherein said seating portion is to be inserted into said socket of said lighting tube to electrically connect said electrode terminals, and wherein said adapter casing has a socket accommodation space for accommodating said socket, said adapter casing arranged to be detachably connected to said connecting portion cover, wherein said adaptor casing and said connection portion cover are to be detachably connected in a state in which said socket into which said seating portion of said lighting tube is inserted is accommodated in said socket accommodation space, whereby said socket and said seating portion of said lighting tube are to be hermetically sealed by said adaptor casing and said connecting portion cover.

13. The adaptor casing as recited in claim 12, wherein a sealing packing is disposed between said adapter casing and said connecting portion cover.

14. The adaptor casing as recited in claim 12, wherein said adapter casing has an outwardly extending flange portion and said connecting portion cover has an outwardly protruding flange portion, wherein said flange portion of said adapter casing is to be connected to said flange portion of said connecting portion cover via a sealing packing with a tightening member.

15. An adaptor for use in a lighting apparatus for attaching a lighting tube, said adaptor, comprising:

a socket; and an adaptor casing, wherein said lighting tube has a lighting tube main body, a seating portion provided at a basal end portion of said lighting tube main body, electrode terminals provided at said seating portion formed between said lighting tube main body and said seating portion in a hermetically sealed manner, wherein said seating portion is to be inserted into said socket of said lighting tube to electrically connect said electrode terminals; and wherein said adapter casing has a socket accommodation space for accommodating said socket, said adapter casing arranged to be detachably connected to said connecting portion cover, and wherein said adaptor casing and said connecting portion cover are to be detachably connected in a state in which said socket into which said seating portion of said lighting tube is inserted is accommodated in said socket accommodation space, whereby said socket and said seating portion of said lighting tube are to be hermetically sealed by said adaptor casing and said connecting portion cover.

16. The adaptor as recited in claim 15, wherein a sealing packing is to be disposed between said adapter casing and said connecting portion cover.

17. The adaptor as recited in claim 16, wherein said adapter casing has an outwardly extending flange portion and said connecting portion cover has an outwardly protruding flange portion, wherein said flange portion of said adapter casing and said flange portion of said connecting portion cover are to be connected via a sealing packing with a tightening member.

18. The adaptor as recited in claim 17, wherein said adapter casing is a box-shaped casing of nonconductive resin and has a power cord passing aperture through which the power cord is introduced into said casing via a sealing bush in a hermetically sealed manner.

19. The adaptor as recited in claim 15, wherein said adaptor casing is provided with an attaching portion for detachably attaching to a certain portion where said lighting apparatus is to be attached.

* * * * *